3,066,573
COMBINED BOW AND FRAME UNIT FOR EYE SHIELD FRONT

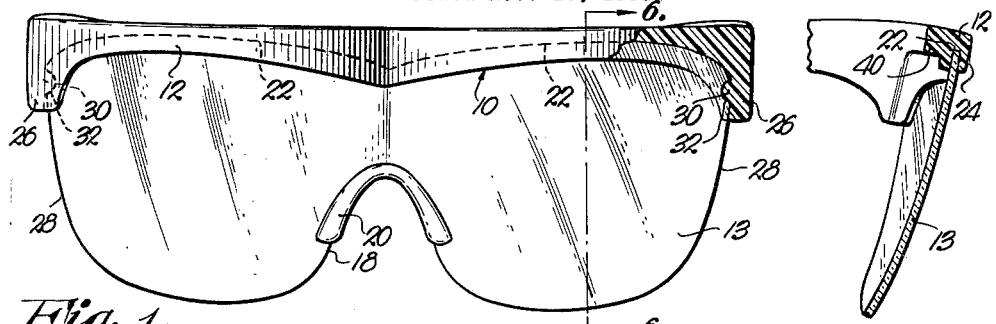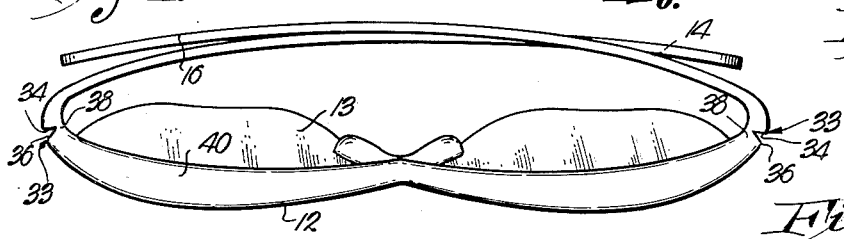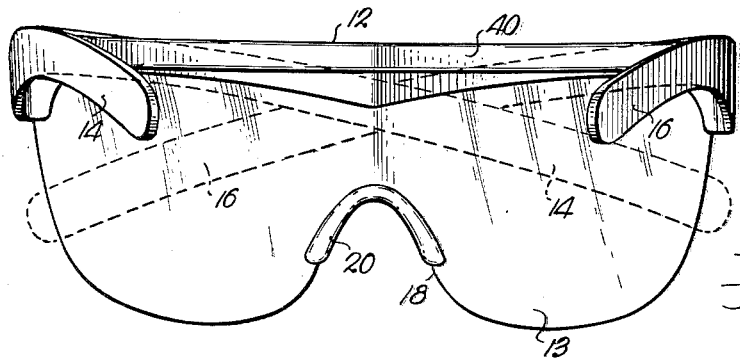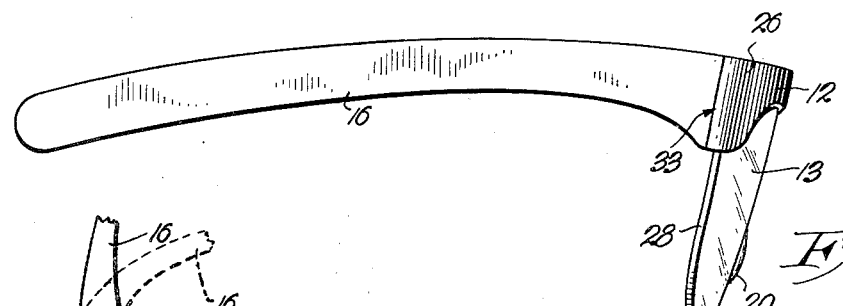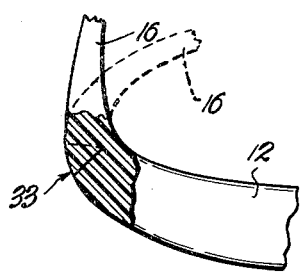

William C. Moeller, Kansas City, Mo., assignor to Parmelee Plastics Company, Kansas City, Mo., a corporation of Missouri Filed Nov. 10, 1958, Ser. No. 772,766
1 Claim. (Cl. 88—41)

This invention relates to eyeglass construction and more particularly, to glasses of the safety goggle type having a main frame supporting a transparent eye shield and bows connected to the shield frame.

The primary object of the invention is to provide an inexpensive, easily manufactured, unitary frame and bow structure adapted to receive a transparent eye shield, as well as a novel process of producing a combination eye shield frame and bows therefor as a unit and in a manner such that the bows tend to assume folded, overlapped positions adjacent the shield frame after the same have been swung to open, head-receiving locations.

A further important object of the invention is to provide unitary shield frame and bow structure which is adapted to be molded as one piece in order to preclude the necessity of providing hinge accessories for pivotally connecting the bows to the supporting frame for the transparent eye shield.

A still further important object is to provide combined frame and templet structure as defined, molded in such a way as to present V-shaped slots at the zones of juncture of respective bows with opposed ends of the frame, whereby swinging movement of the bows to their open, head-receiving positions is rendered substantially easier than would be the case if the defined slots were omitted.

An equally important object of the invention is to provide combined eye shield frame and bow structure as described above wherein opposed, inwardly extending, converging faces of the structure defining respective slots are movable into abutting relationship during swinging movement of the bows slightly before respective bows have been swung to the normally outermost open positions thereof, to impart greater tension on the bows when engaging the person's head to not only maintain the eyeglasses in correct position during wearing of the same but also serving to bias the bows toward their normal folded position after removal of the eyeglasses from the person's head.

Another important object in this respect is to provide a method of producing molded combination frame and bow structure as alluded to above wherein the portions thereof aligned with corresponding slots and of less transverse width than the remaining portions of the bows and frame are subjected to crushing action after molding of the unit, to lower the coefficient of elasticity of the material at the crushed area relative to the remaining segments of the bows and frame whereby greater flexibility is imparted to the hinge portions of the structure.

Other important objects of the invention relate to the provision of improved means on the frame adapted to engage complemental structure on the eye shield to releasably secure the latter to the main frame without supplemental fastening means being required, a particularly important feature being molding of the shield interconnecting means on the frame integral with the latter, thereby precluding the necessity of working the combination eye shield frame and bow structure after initial molding of the same; to a combined bow and frame unit which is adapted to be molded of nylon whereby the required hinge action between the bows and main frame is obtained without either of the bows subsequently being broken from the frame by virtue of the normal swinging movement of the bows relative to such frame, the above result obtaining because of the inherent toughness, flexibility and resilience of nylon; to the provision of improved means on the main frame imparting rigidity to the same while permitting the bows to remain relatively flexible and swingable with respect thereto; to the provision of a combined bow and frame unit having exceptional durability and resistance to various types of deleterious and corrosive liquids normally encountered in areas where safety glasses are worn; and to other important objects and details of the instant assembly and method of producing the same which will become obvious or be explained more fully as the following specification progresses.

In the drawing:

FIGURE 1 is a front elevational view of a combined bow and frame unit having an eye shield therein, certain portions of the main frame of the unit being broken away and in section to reveal details of the interconnection between the frame and the eye shield;

FIG. 2 is a plan view of the unit shown in FIG. 1 and illustrating the normal position in which the same is initially molded;

FIG. 3 is a rear elevational view of the combined bow and frame unit with the normal open positions of the bows being illustrated in full lines and the closed, folded, overlapped positions thereof being illustrated in dotted lines;

FIG. 4 is a side elevational view of the unit with the components thereof in the positions indicated in FIG. 3;

FIG. 5 is an enlarged, fragmentary view of one end of the frame and a corresponding integral extremity of one of the bows, the open position of the bow being indicated in full lines while the folded location thereof is illustrated by the dotted lines: and FIG. 6 is a vertical, fragmentary, cross-sectional view taken on the line 6—6 of FIG. 1 and looking in the direction of the arrows.

A combined bow and frame unit embodying the preferred concepts of the invention is designated broadly in the drawing by the numeral 10 and includes as basic components thereof, a main frame 12 adapted to removably receive a transparent eye shield 13 and a pair of elongated bows 14 and 16 integral with frame 12 at corresponding opposed extremities thereof.

Eye shield 13 adapted to be received by frame 12 is conventional in character in that the same is preferably of one-piece construction and has an inwardly extending notch 18 in the normally lowermost edge thereof, and having a nose-engaging, protective pad element 20 secured within notch 18 and conforming to the configuration of the same. Although the uppermost edge of shield 13 may be of any desired shape, for appearance purposes it is preferred that a pair of identical, longitudinally arcuate margins 22 be provided and converging in direct overlying relationship to notch 18.

Combined bow and frame structure or unit 10 is adapted to be molded as a unitary body in this connection, it is to be noted that main frame 12 is provided with an inwardly and longitudinally extending groove 24 configured to complementally receive arcuate margins 22 of eye shield 13. Outer extremities 26 of main frame 12 are substantially wider than the main portion of frame 12 whereby such extremities extend downwardly along side edges 28 of shield 13 for a short distance, as illustrated in FIG. 1. Simple, efficient and inexpensive means for connecting shield 13 to main frame 12 preferably comprises a pair of projections 30 integral with extremities 26 of main frame 12 within the groove 24 therein and complementally received within corresponding, inwardly extending notches 32 in respective side edges 28 of eye shield 13.

Bows 14 and 16, integral at the innermost ends thereof with respective extremities 26 of main frame 12 are longitudinally arcuate in directions causing such templets to substantially conform to the wearer's head when unit 10 is in place thereon, with the outermost ends of respective bows 14 and 16 remote from frame 12 being in closer relative relationship than the ends of such bows integral with frame 12. Also, bows 14 and 16 curve downwardly as the outer ends thereof are approached to cause such outer ends to hook over the wearer's ears to a certain extent and thereby more effectively maintain unit 12 having shield 13 thereon on the wearer's head.

Bow and frame unit 10 is adapted to be molded in one piece, as described above, and in this connection it is pointed out that it is to be preferred that unit 10 be molded with bows 14 and 16 disposed in their normally folded, overlapped positions adjacent main frame 12, as shown in FIG. 2. In this manner, the bows 14 and 16 are biased toward their folded positions when swung to outer locations adapted to receive the wearer's head. However, in order to facilitate swinging movement of bows 14 and 16 to and from their open positions, substantially V-shaped slots 33 are formed in structure 10 substantially at the zone of juncture of bows 14 and 16 with respective extremities 26 of main frame 12. It is to be understood that slots 33 may be of different configurations, such as semicircular or the like. Inwardly extending outwardly facing slots 33 are each defined by a pair of normally vertical faces 34 and 36 converging as the innermost portions of slots 33 are approached and in predetermined disposition such that opposed faces 34 and 36 of each slot 33 move into abutting relationship during swinging movement of respective bows 14 and 16 slightly before the latter have been swung to the normally outermost, open positions thereof to impart greater resiliency to such bows when in engagement with the wearer's head.

The innermost, transverse areas 38 of structure 10 directly aligned with respective slots 33 and disposed at the zones of juncture of bows 14 and 16 with extremities 26 of main frame 12, serve as integral hinges about which bows 14 and 16 swing to and from their open positions. The transverse width of each area 38 is somewhat less than the depth of slots 33 to permit relatively easy swinging of bows 14 and 16 as referred to above, but not of such insufficient width to destroy the inherent elasticity of the material at areas 38 which would preclude the bows from normally being biased into their folded positions.

Frame 12 has a longitudinally extending, inwardly projecting rib 40 integral with the normally innermost face of frame 12 and preferably provided with an outer surface substantially conforming to the wearer's forehead as shown in FIG. 2. Thus, bows 14 and 16 may flex along the length thereof to a certain extent, whereas main frame 12 is relatively rigid and resists bending along a transverse line.

In order to increase the ease with which bows 14 and 16 may be swung about hinge areas 38 and without destroying the inherent tendency of such bows to return to their normal folded positions, it is preferable to subject areas 38 to a crushing action in order to lower the coefficient of elasticity of such areas. The crushing action may be effected in any conventional manner using a pair of opposed members provided with relatively narrow, opposed leading edges, one of which is moved into engagement with structure 10 at the innermost segment of each slot 33 and at the zone of juncture of faces 34 and 36, while the opposite member is disposed in engagement with that part of each area 38 directly opposed to a respective slot 33. In this manner, a relatively narrow, transverse section is provided at each area 38 having a somewhat lower coefficient of elasticity than the same coefficient of the remainder of the material constituting unit 10.

It can now be appreciated that combined bow and frame unit 10 may be manufactured by a simple molding process, thereby materially decreasing the unit cost of structure 10 not only because of the elimination of fabrication steps but also the manufacture of accessory components such as hinges and the like. Furthermore, the bow and frame unit is of advantage because the same may be constructed of synthetic resin materials, nylon being the preferred one as indicated above, thereby resulting in utilization of relatively inexpensive raw materials to produce structure 10. In this connection, it is to be noted that if desired various fillers and reinforcing compositions may be included in the nylon or other synthetic resin material during molding thereof to increase the wear resistance characteristics of the final product and assuring a long life thereof. The bow and frame unit 10 may also be colored by the simple expedient of including a coloring pigment in the resin composition prior to molding thereof and a permanent, fade resistant and attractive color is easily imparted to the unit.

Having thus described the invention what is claimed as new and desired to be secured by Letters Patent is:

In an eyeglass assembly provided with a transparent eye shield, the combination with said shield of molded structure including a main frame connected to the shield and having a pair of bows integral therewith at opposed extremities of the same, said structure being of tough, flexible, relatively resilient, synthetic resin material capable of being flexed a relatively large number of times without cracking thereof, said bows initially being disposed in folded, overlapped, generally parallel positions proximal to the frame and shield at the time of molding thereof whereby when the bows are swung toward the open, head receiving positions thereof, the inherent resiliency of the material causes the bows to be biased toward the folded positions thereof, said bows being longitudinally arcuate in directions whereby the outermost ends thereof are in closer relative relationship than the ends of the same integral with the frame when the bows are in said open positions thereof whereby the bows substantially conform to the wearer's head, the frame having an integral, longitudinally extending, inwardly projecting rib disposed to prevent substantial flexing of said frame about the longitudinal axis thereof, said structure being provided with inwardly extending, substantially V-shaped, outwardly facing slots therein substantially at the zones of juncture of the bows with respective extremities of the frame, the portions of the structure remaining at said zones of juncture and aligned with corresponding slots being of substantially less transverse width than the bows and frame to thereby present hinges permitting the bows to be swung thereabout to and from said open and closed positions relative to the frame, the opposed, inwardly extending, converging faces defining each of said V-shaped slots being movable into abutting relationship during swinging movement of the bows slightly before respective bows have been swung to the normally outermost open positions thereof, said hinge portions of the structure at said zones of juncture being of less transverse width than the depth of respective V-shaped slots whereby the bows may be swung relatively easily from the closed positions to said open positions thereof, the structure at said zones of juncture having a lower coefficient of elasticity than the material of the bows and said main frame and the transverse width of the structure at said zones of juncture of the bows with opposed extremities of the frame being substantially greater than the width of said bows and the frame to thereby present a long-lasting wear-resistant hinge.

References Cited in the file of this patent

UNITED STATES PATENTS

| | | |
|---|---|---|
| 2,444,498 | Cochran | July 6, 1948 |
| 2,746,087 | Dolezal | May 22, 1956 |

FOREIGN PATENTS

| | | |
|---|---|---|
| 928,486 | France | June 2, 1947 |
| 980,442 | France | Dec. 27, 1950 |
| 1,028,308 | France | Feb. 25, 1953 |